United States Patent
Alonso et al.

(10) Patent No.: US 10,242,107 B2
(45) Date of Patent: Mar. 26, 2019

(54) EXTRACTION OF QUANTITATIVE DATA FROM ONLINE CONTENT

(71) Applicant: Microsoft Technology Licensing, LLC., Redmond, WA (US)

(72) Inventors: Omar Alonso, Redwood Shores, CA (US); Thibault Henri Joseph Sellam, Amsterdam (NL)

(73) Assignee: Microsoft Technology Licensing, LLC, Redmond, WA (US)

( * ) Notice: Subject to any disclaimer, the term of this patent is extended or adjusted under 35 U.S.C. 154(b) by 301 days.

(21) Appl. No.: 14/594,154

(22) Filed: Jan. 11, 2015

(65) Prior Publication Data
US 2016/0203225 A1     Jul. 14, 2016

(51) Int. Cl.
*G06F 17/00* (2006.01)
*G06F 17/30* (2006.01)
*G06Q 50/00* (2012.01)

(52) U.S. Cl.
CPC .. *G06F 17/30867* (2013.01); *G06F 17/30699* (2013.01); *G06F 17/30705* (2013.01); *G06Q 50/01* (2013.01)

(58) Field of Classification Search
CPC ......... G06F 17/30339; G06F 17/30424; G06F 8/40; G06F 8/51; G06F 9/542; G06F 17/30489; G06F 17/30985; G06F 17/245; G06F 17/30873
IPC .............................................. G06F 17/30,17/00
See application file for complete search history.

(56) References Cited

U.S. PATENT DOCUMENTS

| | | | |
|---|---|---|---|
| 6,119,095 A | 9/2000 | Morita | |
| 6,321,158 B1 | 11/2001 | DeLorme et al. | |
| 7,565,157 B1 | 7/2009 | Ortega et al. | |
| 8,463,295 B1 | 6/2013 | Caralis et al. | |
| 8,554,670 B1 | 10/2013 | Blank et al. | |
| 9,122,757 B1 | 9/2015 | Wernick et al. | |

(Continued)

FOREIGN PATENT DOCUMENTS

| | | |
|---|---|---|
| WO | 2009088529 A1 | 7/2009 |
| WO | 2013134171 A1 | 9/2013 |

OTHER PUBLICATIONS

"Second Written Opinion Issued in PCT Application No. PCT/US2016/012400", dated Dec. 8, 2016, 6 Pages.

(Continued)

*Primary Examiner* — Yicun Wu
(74) *Attorney, Agent, or Firm* — Jeffrey L. Ranck; Ranck IP Law

(57) ABSTRACT

Systems and methods for extracting and organizing quantitative content with a corresponding topic in regard to a particular, desired event, from a body of user posts is presented. More particularly, nearly ubiquitously a body of user posts includes a substantial amount of highly relevant and interesting information goes largely unprocessed and widely inaccessible. According to the disclosed subject matter, a body/corpus of user posts is filtered according to a desired event such that those user posts relating to a desired event is identified. Additionally, the user posts are also filtered according to whether or not the user posts include a quantitative value. An analysis of the filtered user posts is conducted to extract, for qualifying user posts, a quantitative tuple comprising a quantitative value and a corresponding topic.

20 Claims, 8 Drawing Sheets

(56) References Cited

U.S. PATENT DOCUMENTS

| | | | |
|---|---|---|---|
| 2003/0065805 | A1 | 4/2003 | Barnes, Jr. |
| 2005/0251406 | A1* | 11/2005 | Bolt .................. G06Q 30/0185 726/23 |
| 2008/0005071 | A1 | 1/2008 | Flake et al. |
| 2008/0023542 | A1 | 1/2008 | Kamat et al. |
| 2009/0005021 | A1 | 1/2009 | Forstall et al. |
| 2009/0222438 | A1 | 9/2009 | Strandell et al. |
| 2009/0228474 | A1 | 9/2009 | Chiu et al. |
| 2009/0265307 | A1* | 10/2009 | Reisman .......... G06F 17/30873 |
| 2010/0120450 | A1 | 5/2010 | Herz |
| 2010/0190510 | A1 | 7/2010 | Maranhas et al. |
| 2010/0312644 | A1 | 12/2010 | Borgs et al. |
| 2011/0184760 | A1* | 7/2011 | Shen ...................... G06Q 10/10 705/3 |
| 2011/0246442 | A1 | 10/2011 | Bartell |
| 2011/0276565 | A1 | 11/2011 | Zheng et al. |
| 2011/0282798 | A1 | 11/2011 | Zheng et al. |
| 2012/0001919 | A1 | 1/2012 | Lumer |
| 2012/0089621 | A1* | 4/2012 | Liu .................... G06F 17/30699 707/749 |
| 2012/0185793 | A1 | 7/2012 | Binsztok |
| 2012/0203832 | A1 | 8/2012 | Vastardis et al. |
| 2012/0233158 | A1 | 9/2012 | Braginsky et al. |
| 2013/0103758 | A1 | 4/2013 | Alison et al. |
| 2013/0246323 | A1 | 9/2013 | Athas et al. |
| 2013/0275429 | A1 | 10/2013 | York et al. |
| 2013/0332460 | A1 | 12/2013 | Pappas et al. |
| 2014/0032452 | A1 | 1/2014 | Perkowitz et al. |
| 2014/0032453 | A1 | 1/2014 | Eustice et al. |
| 2014/0089422 | A1 | 3/2014 | Attalla et al. |
| 2014/0201173 | A1 | 7/2014 | Roth et al. |
| 2014/0222912 | A1 | 8/2014 | St. Clair |
| 2014/0278086 | A1 | 9/2014 | San filippo et al. |
| 2015/0276410 | A1 | 10/2015 | Lamoriniere et al. |
| 2015/0293964 | A1 | 10/2015 | Morfonios et al. |
| 2015/0304437 | A1 | 10/2015 | Vaccari et al. |
| 2016/0360379 | A1 | 12/2016 | Cherry et al. |

OTHER PUBLICATIONS

Becker, Hila, "Identification and Characterization of Events in Social Media", In Thesis Doctor of Philosophy, Nov. 24, 2012, 193 pages.

Landwehr, et al., "Social Media in Disaster Relief", In Proceedings of Studies in Big Data, vol. 1, Sep. 25, 2014, 33 pages.

Imran, et al., "Practical Extraction of Disaster-Relevant Information from Social Media", In Proceedings of 22nd International World Wide Conference, May 13, 2013, pp. 1021-1024.

Popescu, et al., "Extracting Events and Event Descriptions from Twitter", In Proceedings of the 20th International Conference on World Wide Web, Mar. 28, 2011, pp. 105-106.

Chua, et al., "Automatic Summarization of Events from Social Media", In Proceedings of the Seventh International Conference on Weblogs and Social Media, Jul. 8, 2013, 11 pages.

Lin, et al., "Extracting Social Events for Learning Better Information Diffusion Models", In Proceedings of the 19th ACM SIGKDD International Conference on Knowledge Discovery and Data Mining, Aug. 11, 2013, pp. 365-373.

Becker, et al., "Automatic Identification and Presentation of Twitter Content for Planned Events", In Proceedings of the Fifth International Conference on Weblogs and Social Media, Jul. 17, 2011, 2 pages.

Becker, et al., "Identifying Content for Planned Events across Social Media Sites", In Proceedings of the Fifth International Conference on Web Search and Web Data Mining, Feb. 8, 2012, 10 pages.

Rowe, et al., "Aligning Tweets with Events: Automation via Semantics", In Journal Semantic Web, vol. 3, Issue 2, Apr. 2012, 16 pages.

"International Search Report and Written Opinion Issued in PCT Application No. PCT/US2016/012400", dated Apr. 7, 2016, 9 Pages.

"International Preliminary Report on Patentability Issued in PCT Application No. PCT/US2016/012400", dated Mar. 22, 2017, 7 Pages.

"What Are the Best Things to do in Downtown Las Vegas?", Retrieved From: http://www.quora.com/Las-Vegas/What-are-the-best-things-to-do-in-downtown-Las-Vegas, Retrieved on Oct. 6, 2014, 5 Pages.

"What are Unusual, Fun Things to do in San Francisco?", Retrieved From: http://www.quora.com/What-are-unusual-fun-things-to-do-in-San-Francisco, Retrieved on Oct. 6, 2014, 16 Pages.

"Final Office Action Issued in U.S. Appl. No. 14/258,308", dated Oct. 26, 2017, 20 Pages.

"Final Office Action Issued in U.S. Appl. No. 14/258,308", dated Aug. 18, 2016, 15 Pages.

"Non Final Office Action Issued in U.S. Appl. No. 14/258,308", dated Mar. 9, 2017, 15 Pages.

"Non Final Office Action Issued in U.S. Appl. No. 14/258,308", dated Mar. 9, 2016, 14 Pages.

"Non Final Office Action Issued in U.S. Appl. No. 14/258,308", dated May 7, 2018, 18 Pages.

"Final Office Action Issued in U.S. Appl. No. 14/621,211", dated Dec. 7, 2017, 40 Pages.

"Non Final Office Action Issued in U.S. Appl. No. 14/621,211", dated May 24, 2017, 34 Pages.

Anagnostopoulos, et al., "Socio-Semantic Query Expansion using Twitter Hashtags", In Proceedings of Seventh International Workshop on Semantic and Social Media Adaptation and Personalization, Dec. 3, 2012, 6 Pages.

Baeza-Yates, et al., "Query Recommendation using Query Logs in Search Engines", In Proceedings of the International Conference on Current Trends in Database Technology, Mar. 14, 2004, 10 Pages.

"International Preliminary Report on Patentability Issued in PCT Application No. PCT/US2015/024597", dated Jul. 7, 2016, 7 Pages.

"International Search Report & Written Opinion Issued in PCT Application No. PCT/US2015/024597", dated Jul. 6, 2015, 10 Pages.

"Second Written Opinion Issued in PCT Application No. PCT/US2015/024597", dated May 6, 2016, 6 Pages.

"International Preliminary Report on Patentability Issued in PCT Application No. PCT/US2016/016237", dated Apr. 20, 2017, 7 Pages.

"International Search Report and Written opinion Issued in PCT Application No. PCT/US2016/016237", dated Apr. 22, 2016, 10 Pages.

"Second Written Opinion Issued in PCT Application No. PCT/US2016/016237", dated Dec. 21, 2016, 6 Pages.

Wu, Neal, "San Francisco: What are the best things to do in San Francisco when it's raining and cold?", Retrieved From: http://www.quora.com/San-Francisco/What-are-the-best-things-to-do-in-San-Francisco-when-its-raining-and-cold, Retrieved on Oct. 6, 2014, 6 Pages.

Zhang, et al., "Mining Search Engine Query Logs for Query Recommendation", In Proceedings of the 15th International Conference on World Wide Web, May 23, 2006, 4 Pages.

Zheng, et al., "Collaborative Location and Activity Recommendations with GPS History Data", In Proceedings of the 19th International Conference on World Wide Web, Jan. 2010, pp. 1029-1038.

"Non Final Office Action Issued in U.S. Appl. No. 14/621,211", dated Aug. 10, 2018, 45 Pages.

"Final Office Action Issued in U.S. Appl. No. 14/258,308", dated Oct. 18, 2018, 15 Pages.

* cited by examiner

EXTRACTION OF QUANTITATIVE DATA FROM ONLINE CONTENT

BACKGROUND

When an event occurs that affects the lives of people, one of the responses is to generate and disseminate comments regarding the event. Often, the comments are made in the form of social content and distributed via one or more online social services. For example, when a massive earthquake struck Japan, millions of people posted, texted, or tweeted information relating to the event. These millions of people included both people directly affected by the earthquake, people tangentially affected by the earthquake, as well as those that demonstrated an interest or concern regarding the earthquake.

While people are often aware of the main topic or topics of a particular event, there are typically numerous sub-topics and related topics to the event, most of which are lost in the buzz surrounding the main topic and go largely unnoticed by the general populace. Referring again to the earthquake and resultant tsunami in Japan (in 2001), information such as the fact that a 250-mile-long coastal section of Japan dropped in altitude by two feet that allowed the tsunami to travel farther and faster inland, though published, received relatively little notice in light of the overall "story" of the quake and the destruction caused by the tsunami. Yet this fact, and many others, tell a very interesting and robust story about the event.

While there are typically numerous, significant details surrounding any given event, many of the details will typically fall into obscurity without any means for retrieving them or accessing them, including viewing/presenting the details within the context of the event. Thus, the true scope of most events is lost.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Systems and methods for extracting quantitative content with a corresponding topic in regard to a particular, desired event, from a body of user posts is presented. More particularly, nearly ubiquitously a body of user posts includes a substantial amount of highly relevant and interesting information goes largely unprocessed and widely inaccessible. According to the disclosed subject matter, a body/corpus of user posts is filtered according to a desired event such that those user posts relating to a desired event is identified. Additionally, the user posts are also filtered according to whether or not the user posts include a quantitative value. An analysis of the filtered user posts is conducted to extract, for qualifying user posts, a quantitative tuple comprising a quantitative value and a corresponding topic.

According to aspects of the disclosed subject matter, a quantitative data extraction service is presented. The quantitative data extraction service is a service implemented on a computing system comprising at least a processor and a memory, where the processor executes instructions retrieved from the memory as part of or in conjunction with additional components to generate quantitative tuples from a corpus of user posts. These additional components comprise at least a quantitative tuple generator, an event filter component, a quantitative value filter component, and a tuple extraction component. The quantitative tuple generator is configured to receive an indication of a desired event, access a first corpus of user posts, and extract/generate a body of quantitative tuples from the user posts. In extracting/generating the quantitative tuples, the quantitative tuple generator filters the corpus of user posts according to the desired event via an event filter component which results in a second corpus of user posts comprising user posts each corresponding to the desired event. The quantitative tuple generator also filters the second corpus of user posts according to whether or not the user posts each include a quantitative value via a quantitative value filter component, resulting in a third corpus of user posts comprising user posts each having a quantitative value in the content of the user post. For each of the user posts of the filtered corpus of user posts, a determination is made as to whether the content of the user post includes at least a quantitative value and a topic, wherein the quantitative value corresponds to the topic. Upon determining that the user post includes a quantitative value and topic and that the quantitative value corresponds to the topic, a quantitative tuple is extracted based on the quantitative value, and quantitative tuple is stored in a set of quantitative tuples.

According to additional aspects of the disclosed subject matter, a computer-implemented method for generating a body of quantitative tuples from a corpus of user posts is presented. The method includes accessing a first corpus of user posts and filtering the first corpus of user posts according to a desired event. The result of filtering the first corpus of user posts according to the desired event is a second corpus of user posts corresponding to the desired event. With regard to the method, the second corpus of user posts is filtered according to whether or not the user posts include a quantitative value. The result of filtering the second corpus of user posts according to whether or not the user posts include a quantitative value is a third corpus of user posts corresponding to the desired event that include a quantitative value. With regard to the method, quantitative tuples are extracted from the user posts of the third corpus of user posts. Extracting quantitative tuples from the user posts comprises, for each user post of the third corpus of user posts first determining whether the user post includes at least a quantitative value and a corresponding topic, and generating a quantitative tuple from at least the quantitative value and the corresponding topic in a set of quantitative tuples upon determining that the user post includes a quantitative value and corresponding topic. The quantitative tuples are then stored in a quantitative tuple data store for access.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1:
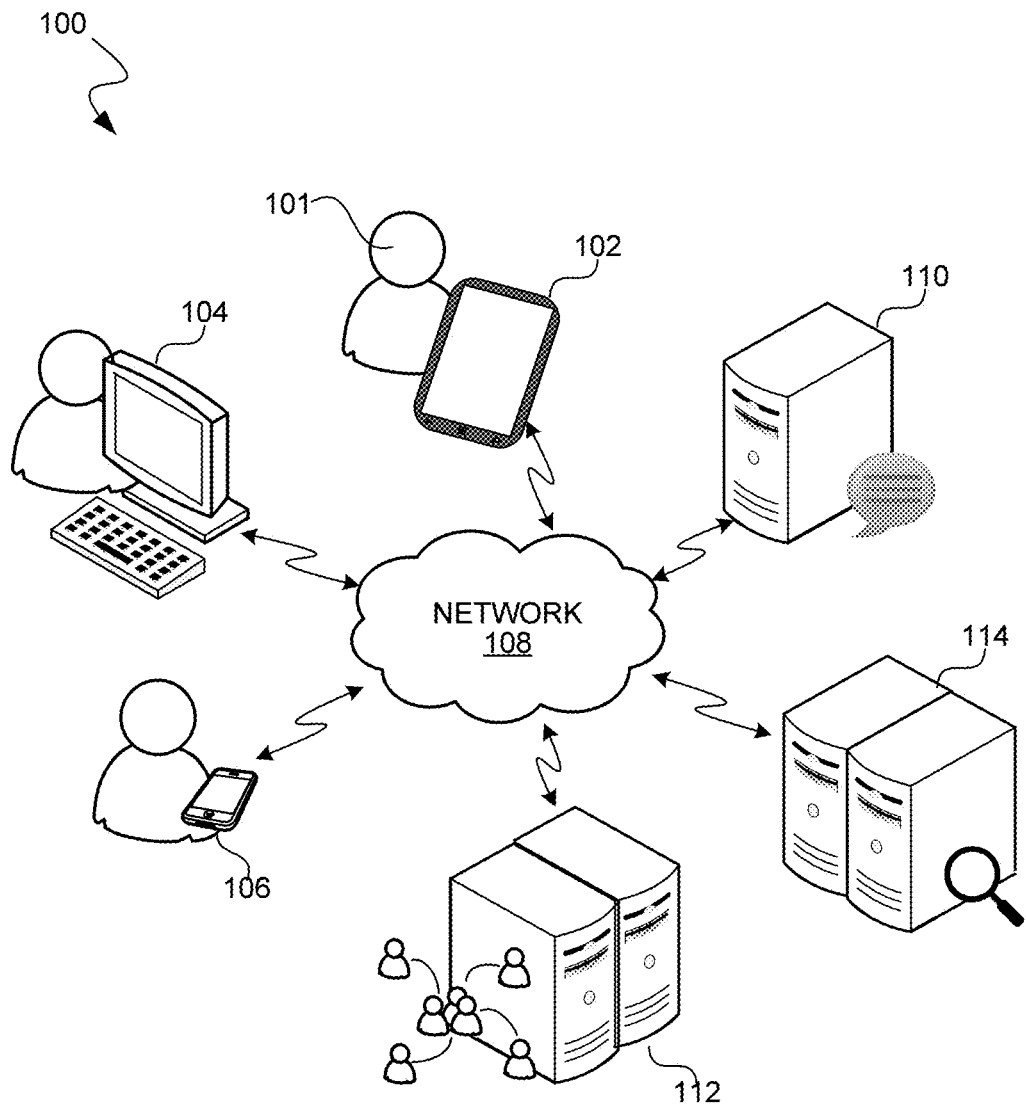
FIG. 1 is block diagram illustrating an exemplary networked environment suitable for implementing aspects of the disclosed subject matter.

For purposes of clarity, the term "exemplary" in this document should be interpreted as serving as an illustration or example of something, and it should not be interpreted as an ideal and/or a leading illustration of that thing.

The term "user post" refers to computer user (or more simply a "user") generated content regarding a particular event, occurrence, condition, situation, etc. Typically, a user post is a short post of content, typically directed to other users within a social network. An example of a user post is a text message (as is typically understood) on a computing device regarding a particular event or occurrence. Similarly, an example of a user post is a content post on a social networking site, such as Facebook®. Still further, a message sent across a broadcasting social service, such as a Tweet on Twitter® is also a user post. Of course, these examples of user posts are not an exhaustive list but rather illustrative of user posts. While user posts are frequently in the form of textual content, the disclosed subject matter is not so limited. For example, a user post may correspond to an image, audio-based content, or audio/video-based content.

Generally speaking, an "event" denotes a thing that occurs or happens, typically but not exclusively a thing of importance or significance. However, as used herein when referring to extracting quantitative content regarding an "event," the term is broadly used to include conditions, situations, and the like. Often an event will correspond to a specific moment in time or time period. However, in various embodiments of the disclosed subject matter, an event may correspond to an on-going, continuing circumstance, situation or condition. Further still, an event may be cyclical or periodic.

The term, "quantitative value," refers to a number or amount with regard to a particular topic. Often, but not exclusively, a quantitative value is specific value/amount with regard to a particular topic and corresponds to a type of measurement. Typically, the value will be accompanied by the nature of the value: e.g., percent, miles, repetitions, etc. While a quantitative value is often a specific value/amount, a quantitative value may also be a relative amount. For example, the phrase "twice the typical annual snowpack" includes a quantitative value "twice" and, while it does not (of itself) specify an absolute value, the relative value "twice" should be viewed as a quantitative value.

The term "quantitative tuple" refers to an aggregation of at least a quantitative value and a corresponding topic. With regard to the example phrase "twice the typical annual snowpack," the quantitative tuple would comprise at least the quantitative value "twice" with the corresponding topic "annual snow pack." While a quantitative tuple will include at least a quantitative value and a corresponding topic, a quantitative tuple may include additional elements related to the value/topic pairing. For example, a quantitative tuple from the example phrase "twice the typical annual snow-pack" may also include elements (by way of illustration and not limitation) regarding where the snow pack is located, what year (or month) the statement was made, and the like.

According to aspects of the disclosed subject matter, systems and methods for extracting quantitative data from online content is presented. As a general description, a corpus of online content is accessed and a subset of the corpus that pertains to a particular event is identified, referred to as event content. Each item of event content is evaluated as to whether or not the item of content includes a quantitative value, and the subset of items of event content that include a quantitative value are referred to as quantitative event content. The items of content in the quantitative event content is evaluated to identify those items of content that include, at least, a quantity corresponding to a topic. From those items of content that include at least a quantity and corresponding topic, a quantitative tuple is generated and aggregated and, in so doing, a collection of quantitative data regarding an event is generated and stored.

Turning now to the figures, FIG. 1 is block diagram illustrating an exemplary networked environment 100 suitable for implementing aspects of the disclosed subject matter. In particular, the networked environment 100 includes one or more user computing devices, such as user computing devices 102-106, each connected to a network 108 via a network connection. Using a computing device a user, such as computer user 101 via computing device 102, can generate one or more user posts regarding one or more events. The network environment 100 also includes various social networking services (implemented on one or more computing devices), such as social networking services 110 and 112. Typically, but not exclusively, the user posts from the computer users via the computing devices are transmitted to the social networking services and made available to other computer users. Further, the social networking services typically maintain and store the user posts from multiple users and, in some instances, the user posts can be made available to other services. According to aspects of the disclosed subject matter the user posts from the various social networking services is made available to a quantitative data extraction service 114 (as implemented by one or more computing devices). As can be seen, the quantitative data extraction service 114 is also connected to the network 108 via network connection.

By way of illustration and not limitation, user computing devices, such as user computing devices 102-106, may include a variety of computing devices including, but not limited to: desktop computers, such as user computing device 104; laptop computers; tablet computers, such as tablet computing device 102; smart phones, such as smart phone 106; wearable devices; and the like. Through various user interfaces on a computing device, such as computing device 102, a computer user, such as user 101, inputs information that is the basis of one or more user posts. These user posts are then typically transmitted over a network 108 to one or more services, such as the social networking services 110 and 112, where they become accessible to others, as well as being stored by the services.

Figure 2:
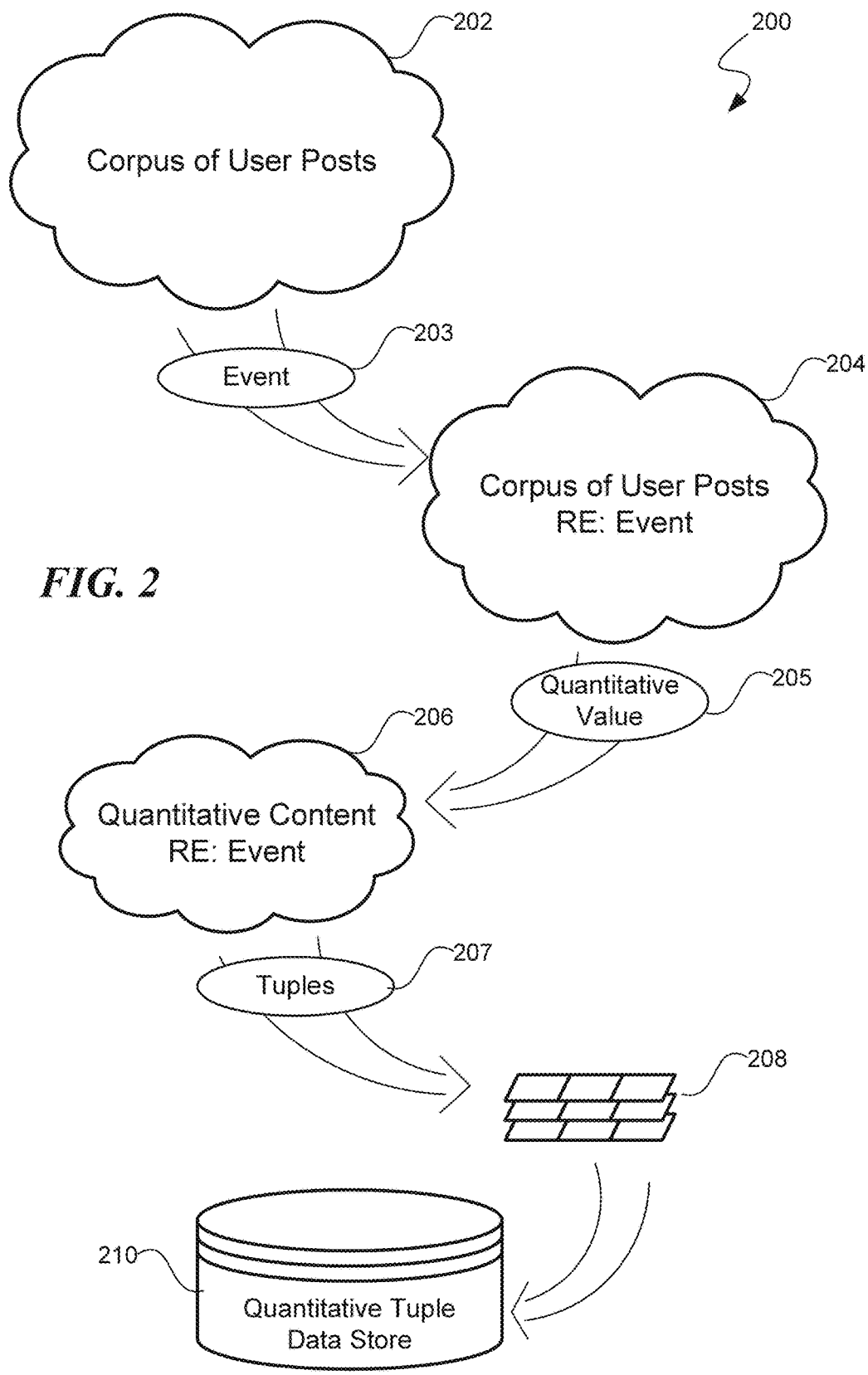
FIG. 2 is a block diagram illustrating exemplary processing steps from a body of content items into quantitative tuples stored in a quantitative tuple data store.

The quantitative data extraction service 114 accesses the user posts of a plurality of computer users stored by each of the social networking services 110-112 to extract quantitative information from the user posts and generated quantitative information regarding one or more events. The process of extracting the quantitative information regarding an event is set forth in general detail in regard to FIG. 2. FIG. 2 is a block diagram illustrating processing steps of an exemplary process 200, as implemented by the quantitative data extraction service 114, in extracting quantitative information, particularly quantitative tuples, from a corpus of user posts (typically corresponding to a plurality of computer users) obtained from one or more sources of user posts including social networking services, such as social networking services 110 and 112.

The process 200 begins with the corpus of user posts 202 that have been obtained from one or more sources, such as social networking sites 110 and 112. A first processing 203 occurs in filtering the corpus of user posts 202 to only those user posts that correspond to a particular event. The filtering may conducted according to a variety of aspects regarding the user posts. These include, but are not limited to: filtering according to date/time (i.e., user posts that were generated during a predetermined time period); filtering according subject matter within a user post recognized to be associated with the event including so-called hashtags; geographic origin of the user post; originator of the user posts (e.g., from a computer user known to be associated with or an authority of the event); and the like. The result of filtering/processing 203 the initial corpus of user posts is a second corpus 204 of user posts corresponding to the event.

The second corpus 204 of user posts is again filtered/processed 205; this second processing corresponding to identifying and retaining those user posts that include quantitative information in the content of the user posts. The results of this process 205 is a third corpus of user posts that correspond to a particular event and include a quantitative value. In examining text-based user posts, the content of a user post may be evaluated for a quantitative value by scanning, searching, and/or conducting a syntactic analysis for numerical digits, for the textual representation of numbers (e.g., "four" or "twenty"), as well as patterns that represent numerical value (e.g., "score," "dozen," or "gross"). Similarly, numerical values of other languages, e.g., Spanish, French, Chinese, etc., may also be recognized. Pattern matching may be used to identify one or more quantitative values in a user post.

Once the corpus of user posts 206 that correspond to an event and that include a quantitative value is identified, another filter/process 207 is applied to the remaining user posts in order to generate a set of quantitative tuples 208. Each quantitative tuple includes at least a quantity and a topic. Thus, from an exemplary user post such as "Japan coast drops 2.5 feet during earthquake," the process 207 would generate a tuple comprising something like {2.5}{Number of feet Japanese coast dropped during quake}. In addition to the quantitative value and the corresponding topic, a quantitative tuple may also include additional elements of information derived from the user post. According to various embodiments, the additional elements may include, by way of illustration and not limitation: contextual information regarding the tuple (not including the quantitative value or the corresponding topic, of course); a confidence value regarding the validity of information in the tuple with regard to the event; the date of origin of the user post; thread information regarding the user post, including the number of reposts of the user post; that the user post was generated by person viewed as an authority of the desired event; the location in which the user post was generated; the number of user posts directed to the corresponding topic of the quantitative tuple; and the like.

Figure 3:
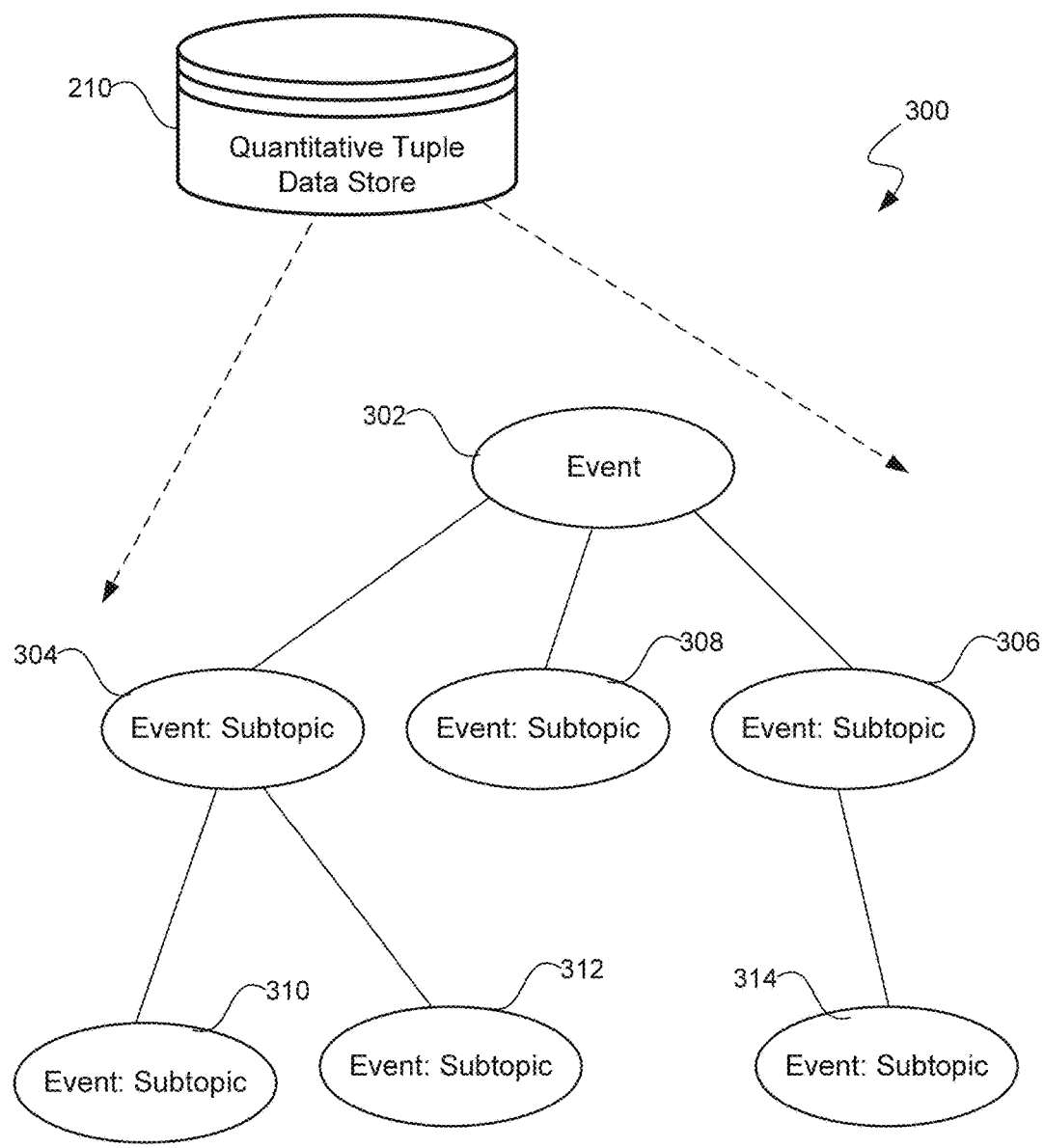
FIG. 3 is a block diagram illustrating an exemplary topical graph corresponding to an event and various subtopics comprising aggregated and/or clustered quantitative tuples.

In addition to generating the quantitative tuples, the process 207 groups similar/like quantitative tuples, maintaining a count as to the number of user posts that indicated the quantitative information, and the quantitative tuples are stored in a quantitative tuple data store 210. As part of storing the quantitative tuples, the groups of quantitative tuples may be organized according to topic and subtopic, which can be further organized into one or more graphs of related quantitative content, including a hierarchical graph. As should be appreciated, an advantage realized by organizing and clustering the quantitative tuples into topics/subtopics and/or graphs is to create structures or taxonomies from the clusters to represent the quantitative information in a manner that can be readily accessed and explored. FIG. 3 is a block diagram illustrating an exemplary topical graph 300 corresponding to an event and subtopics, comprised of a main node 302 corresponding to the event, nodes 304-308 corresponding to subtopics of the event, and nodes 310-12 and 314 corresponding to subtopics of the subtopics 304 and 306, respectively. By way of illustration and with regard to the example of the Japan 2011 earthquake mentioned above, node 302 may correspond to the earthquake, while node 304 may correspond to the resultant tsunami, and node 310 may correspond to the subtopic regarding the Japanese coast dropping 2.5 feet during the quake, thereby allowing the tsunami to reach further and faster inland. Of course, while the topical graph 300 is presented in FIG. 3 as a hierarchical graph, this is illustrative of one embodiment and should not be viewed as limiting upon the disclosed subject matter.

Associated with each of the nodes in the topical graph 300 is one or more quantitative tuples regarding the particular subject matter of the topic/sub-topic. Each node in the topical graph 300 may identify the number of user posts regarding the particular subject matter. Further, each node may include one or more representative user posts regarding the subject matter. In some circumstances, a confidence value may be associated with one or more nodes indicating a confidence that the quantitative tuple (the quantitative value and corresponding subject matter) is accurate. Information regarding authoritative users that generated one or more user posts may be included as well.

Figure 4:
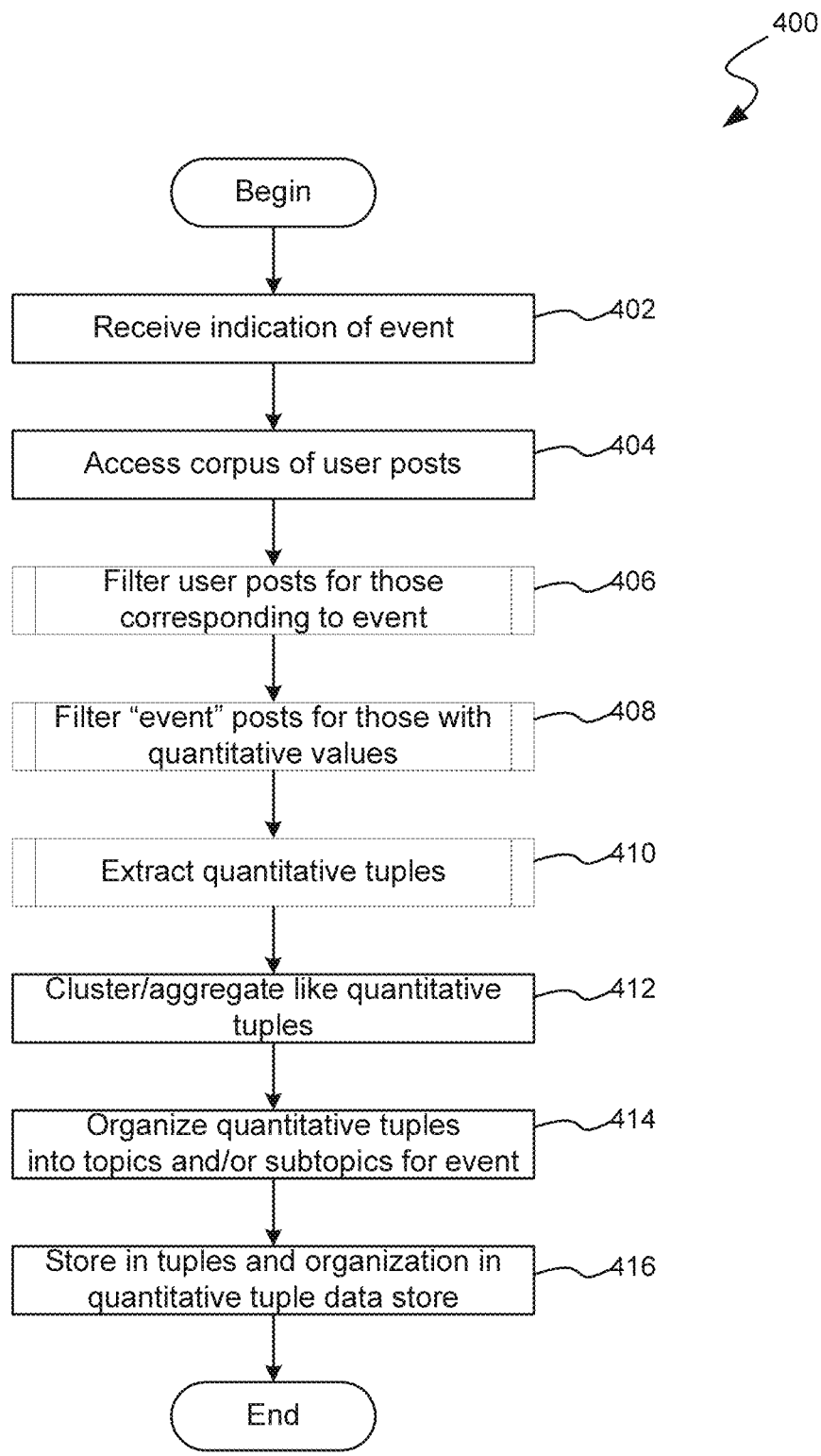
FIG. 4 is a flow diagram illustrating an exemplary routine suitable for processing a corpus of user posts, generating quantitative tuples, and organizing the quantitative tuples into a topical graph.

Turning now to FIG. 4, this figure is of a flow diagram illustrating an exemplary routine 400 suitable for processing a corpus of user posts, generating quantitative tuples, and organizing the quantitative tuples into one or more topical graphs, such as topical graph 300. Beginning at block 402, an executing process (such as a process or service provided by the quantitative data extraction service 114 executing on a computing device) receives an indication to extract quantitative data from user posts regarding the event. At block 404, the corpus of user posts (or online content) is accessed for analysis with regard to the particular event.

Figure 5:
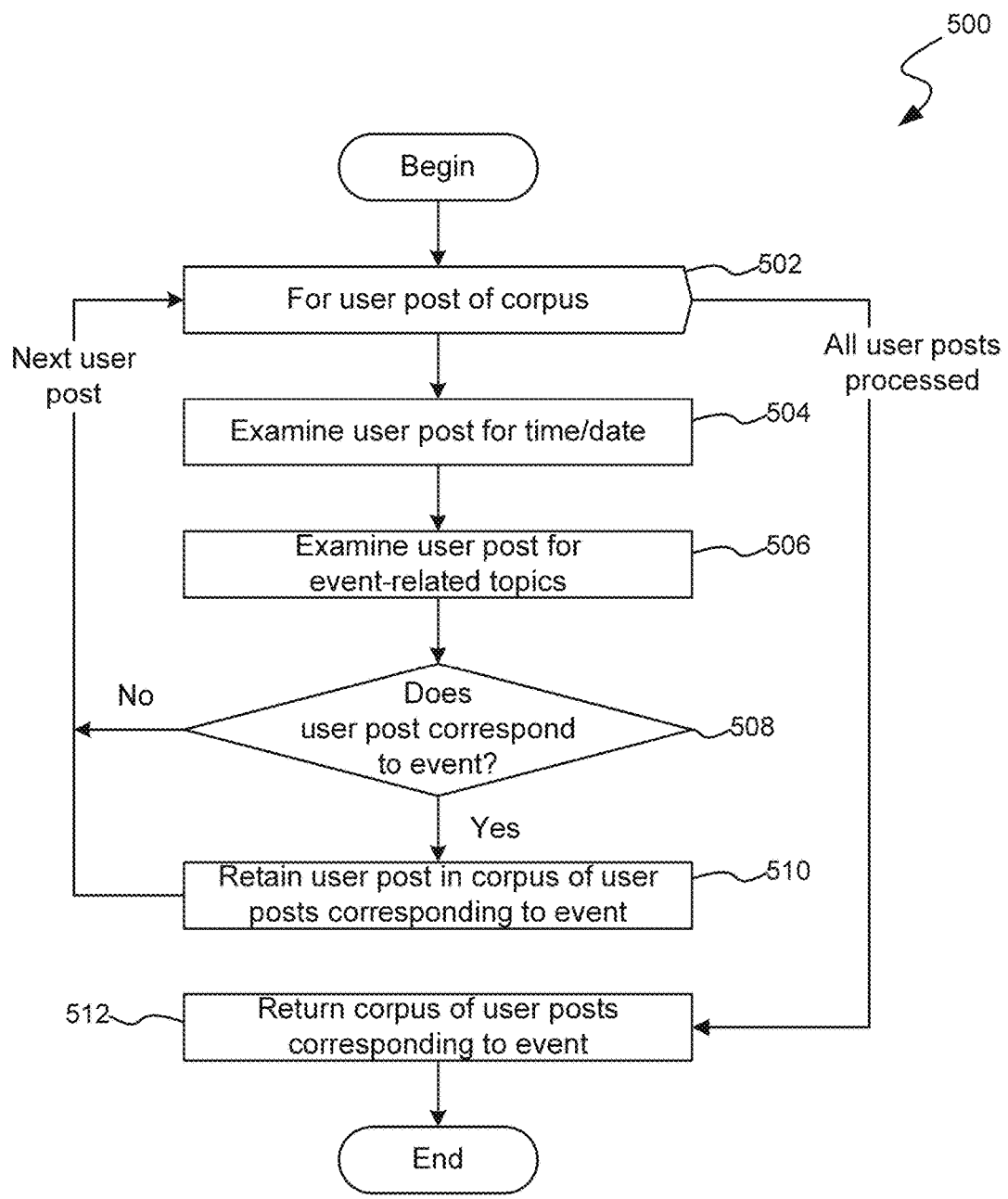
FIG. 5 is a flow diagram illustrating an exemplary routine for filtering a corpus of user posts according to a particular event.

At block 406, the corpus of user posts is filtered to identify those that relate to the particular desired event. Filtering the corpus of user posts for those posts corresponding to the event is described in regard to FIG. 5. Turning to that figure, FIG. 5 is a flow diagram illustrating an exemplary routine 500 for filtering a corpus of user posts according to a particular event. Beginning in block 502, an iterative loop begins to process each user post of the corpus of user posts. For purposes of brevity in description of FIG. 5, when reference is made to "the user post" or a single user post, it is a shorthand reference to "the user post of the corpus of user posts that is currently being processed by the iterative loop." As an exception to reference to a single user post, the "next user post" is shorthand for "the next user post of the corpus of user posts to be processed by the iterative loop."

After beginning the iterative loop of processing the corpus of user posts, at block 504, the user post is examined to verify whether the user post was generated and/or distributed at a time that corresponded with the desired event for which the corpus of user posts is being filtered. Often, but not exclusively, a definite time period relevant to the desired event may be used as a filter to identify those user posts that potentially correspond to the desired event. For example with regard to the 2011 Japan earthquake, most user posts that were generated before the time of the earthquake are likely not related to the event. Even so, in a non-limiting example, there may have been some user posts that described particular conditions that could be viewed as precursors to the earthquake, or conditions with regard to the Fukushima nuclear facilities that are relevant to the event. Thus, while examining a user post for a particular time/date may correspond to a more positive indication of relevancy to the desired event, in some cases it may not yield fully indicate that the user post is not related to the desired event. In certain embodiments, a confidence value may be associated with the user post indicating a relative confidence that the user post may be related to the desired event based on a time period.

At block 506, the user post may further be evaluated to determine whether the user post includes subject matter (i.e., an event-related topic) that is related to the desired event. In the case that the user post is text-based, a taxonomy of words and phrases related to the desired event may be used in pattern matching to determine a likelihood that the user post is related to the desired event. This likelihood can then be combined with any confidence value already associated with the user post to modify, as appropriate, the level of confidence that the user post is related to the desired event. The taxonomy may include phrases (slogans, mottos, catchphrases, etc.) that people were/are known to user with regard to the desired event. Additionally, an examination of the user post thread (tracing back to a source or previous user post known to be related to the event) may also be used. Often, though not exclusively, a semantic analysis of the content may be used, often in conjunction with one or more of the techniques mentioned above, to determine whether that subject matter of the user post is related to the desired event. Also, for those user posts that are not textual in nature, pattern matching among phonemes may be used. Transcription from audio to text and then implementation of various techniques, including all or some of those mentioned above, may be used. OCR transcription (which is known in the art) may be used to render a textual representation of characters found in an image, which may then be processed via the textual processing mentioned above. Pattern matching to other images, sounds, and/or videos known to be related to the desired event may be employed depending on the nature of the content of the user post. All of these may be used in determining (or updating) a confidence value that the user post is related to the desired event.

While not mentioned, there may be additional attributes of the user post that may be examined to determine whether or not the user post is related to the desired event. These attributes include, by way of illustration and not limitation: the location of the user/originator of the user post at the time that the user post was generated; the language in which the user post is generated; that the user/originator of the user post is a known authority of the topic of the desired event; and the like. As above, these attributes may be used as factors to determine or update a confidence value associated with the user post that it is or is not related to the desired event.

At decision block 508, a determination is made as to whether the user post is (or likely is) related or corresponds to the desired event. In one embodiment, this may be a true/false determination according to whether the user posts meets one or more criteria of the above-described process (e.g., within a specific time period, subject matter confirmed to be that of the event, etc.) Alternatively, to the extent that a confidence value regarding whether or not the user post is related to the event has been generated during processing, the confidence value of the user post may be compared to a predetermined threshold such that if the user post has a sufficiently high confidence value to meet or exceed the threshold then the user post should be retained as being related to the event. Alternatively, if the confidence value of the user post does not meet the predetermined threshold value, the user post should not be retained. Thus, at decision block 508, if the user post is not to be retained, the routine 500 returns to block 502 where the next user post is to be processed. On the other hand, at decision block 508, if the user post is to be retained, the routine 500 moves to block 510. At block 510, the user post is retained as being in the corpus of user posts corresponding to the event. Thereafter, the routine 500 returns to block 502 to process the next user post in the iteration and processing of the corpus of user posts.

At block 502, once the iteration process has processed all user posts, the routine 500 proceeds to block 512 where the corpus of user posts corresponding or relating to the event (those not filtered out from further processing by routine 500) is returned, and the routine 500 terminates.

Figure 6:
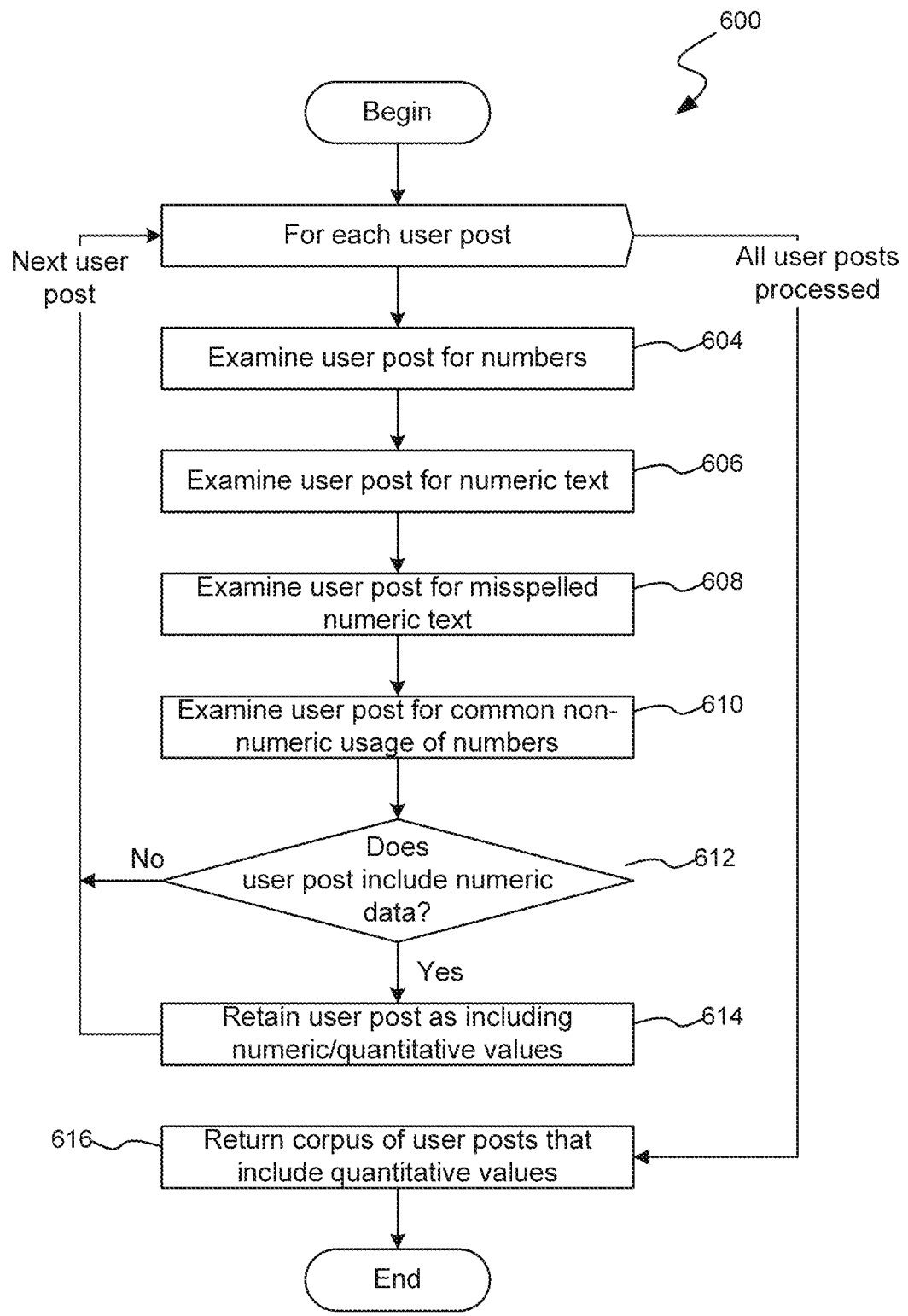
FIG. 6 is a flow diagram illustrating an exemplary routine for filtering a corpus of user posts for those that include a quantitative value.

With reference again to FIG. 4, after receiving the user posts corresponding or relating to the event from routine 500, this filtered corpus is then further filtered to generate a corpus of user events that correspond to the event and that further include a quantitative value. This second filtering is described in regard to FIG. 6. Turning to that figure, FIG. 6 is a flow diagram illustrating an exemplary routine 600 for filtering a corpus of user posts for those that include a quantitative value. Beginning at block 602, an iterative loop begins to process each user post of the corpus of user posts. As above, for purposes of brevity in description of FIG. 6, when reference is made to "the user post" or a single user post, it is a shorthand reference to "the user post of the corpus of user posts that is currently being processed by the iterative loop." As an exception to reference to a single user post, the "next user post" is shorthand for "the next user post of the corpus of user posts to be processed by the iterative loop."

At block 604, the user post is examined for numbers. When the content of a user post is a text-based user post, an examination of the text for numerical characters may indicate whether or not the user post includes numbers. In the case of non-textual content, transcription of audio to text, or OCR (optical character recognition) of image to text and subsequent evaluation of the translated content for numbers may be made.

At block 606, the user post is examined for numeric text, i.e., numbers spelled out rather than represented by numeric characters. An example of numeric text may be "four," "dozen," "double," and the like. Again, for non-text content, transcription from original content may be made. Alternatively, phoneme matching (for audio) and/or pattern matching (for images or video) may be employed to identify both numbers and numerical text.

At block 608, the user post (particularly, but not exclusively, in regard to textual content) is examined for misspelled numeric text, i.e., content that should be numerical content but is misspelled. Examples of misspelled content include "for" instead of "four," "to" instead of "two," "4teen" for "fourteen," and the like. These corrections may be made after a semantic analysis of the content to determine whether or not a word (such as "for" or "four") is misspelled, given the context of its usage. For example, in the phrase "pray four peace" the word "four" is a misspelling of the word "for," and the user post should not be evaluated as including numeric text. Conversely, in the phrase "there were for people present," the word "for" is a misspelling of the word "four" and the corresponding user post should be evaluated as including numeric text.

At block 610, the user post (again, with particularity to text-based content) is evaluated for common non-numeric usage of numbers. Examples include (by way of illustration and not limitation) phrases such as: "sent it 2 me," "that is gr8," and "pray 4 peace." A semantic analysis of these to determine the likely user intent of the phrasing is used to identify when the usage of numbers corresponds to non-numeric content.

Based on the various examinations, evaluations, and analyses described above, at block 612 a determination is made as to whether or not the user post includes a numeric/quantitative value. If not, the user post is not included in the filtered corpus of user posts that include quantitative values and the routine 600 returns to block 602 to process the next user post. Alternatively, if it is determined that the user post includes a quantitative value, the routine 600 proceeds to block 614 and the user post is retained in the filtered corpus of user posts that includes a numeric/quantitative value.

At block 602, once it is determined that all user posts of the corpus that is being processed have been evaluated, the routine proceeds to block 616 where the corpus of user posts that includes a numeric/quantitative value is returned and the routine 600 terminates.

Figure 7:
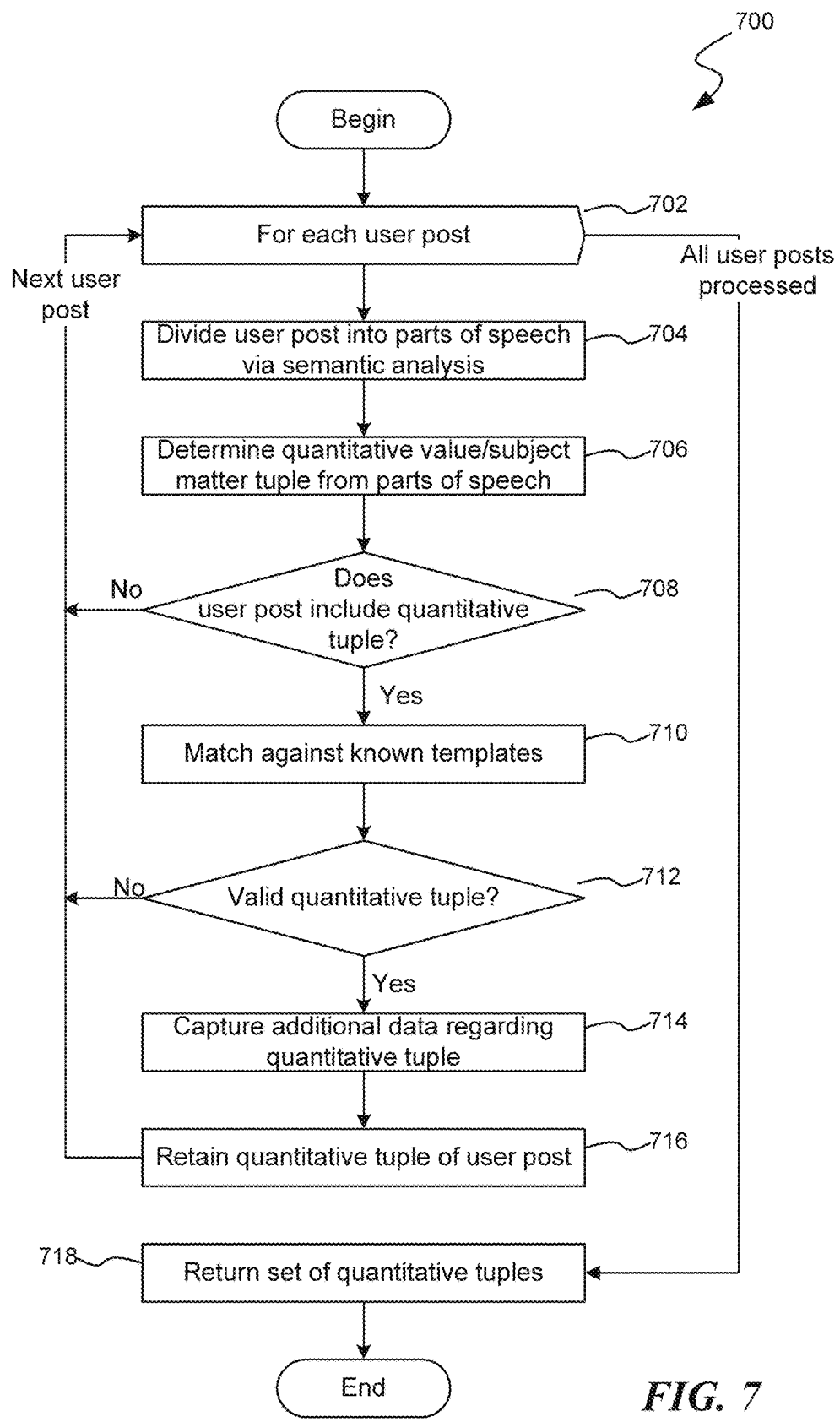
FIG. 7 is a flow diagram of an exemplary routine 700 for extracting quantitative tuples from user posts.

With reference again to FIG. 4, after receiving the filtered corpus of user posts that includes a numeric/quantitative value from routine 600, this filtered corpus is then evaluated to extract quantitative tuples from the user posts. Extracting quantitative tuples from the filtered corpus of user posts that that includes a numeric/quantitative value and that are also related to the desired event, is described in regard to FIG. 7. Turning to that figure, FIG. 7 is a flow diagram of an exemplary routine 700 for extracting quantitative tuples from user posts.

Beginning at block 702, an iterative loop is begun to process all of the user posts (that have been filtered according to the event and that have a quantitative value.) As above, for purposes of brevity in description of FIG. 7, when reference is made to "the user post" or a single user post, it is a shorthand reference to "the user post of the corpus of user posts that is currently being processed by the iterative loop." As an exception to reference to a single user post, the "next user post" is shorthand for "the next user post of the corpus of user posts to be processed by the iterative loop."

At block 704, the content/subject matter of the user post is divided into parts of speech via a semantic analysis of the content. Dividing the content of the user post into parts of speech may be performed using a taxonomy of the language structure of the content. For example, words in the English language may be evaluated according to a lexical database, such as Word Net®, and compared to a taxonomy of syntactic structures to identify the parts of speech such that a topic and a corresponding quantitative value can be extracted. At block 706, a quantitative value/subject matter pair/tuple is determined (or an attempt to determine) from the various parts of speech, the tuple comprising at least a quantitative value and a corresponding topic.

At block 708, a determination is made whether a quantitative tuple was identified from the user post. If not, the process 700 returns to block 702 to process the next user post in the corpus of user posts that are being processed. Alternatively, if a quantitative tuple was identified/determined from the user post, the routine 700 proceeds to block 710. At block 710, the quantitative tuple is optionally matched against templates of known tuples to determine whether the determined quantitative tuple is a valid quantitative tuple. Typically, but not exclusively, the know templates are a "black list" of templates, i.e., templates that are not valid quantitative tuples. At decision block 712, if the previously identified quantitative tuple is determined to not be a valid quantitative tuple, the routine 700 returns to block 702 to process the next user post. Alternative, the routine proceeds to block 714.

At block 714, additional data regarding the determined quantitative tuple for the user post is identified and added to the tuple. As indicated above, this may various aspects of the user post include (by way of illustration and not limitation): the user that generated the user post, the date/time of generation of the user post, the geo-location when the user post was generated, a confidence factor relating to the subject matter of the user post, and the like. At block 716, the quantitative tuple is retained and the process returns to block 702 to process a next user post.

The iterative process (begun in block 702) continues as described above until all user posts have been processed. Thereafter, at block 718, the set of quantitative tuples is returned as the result of the routine 700 and the routine terminates.

Return, once again, to FIG. 4, after extracting the quantitative tuples from the user posts, at block 412 the quantitative tuples are clustered/aggregated according to similarity, particularly (but not exclusively) according to subject matter. By clustering the quantitative tuples, sub-topics regarding the desired event can be identified. Indeed, at block 414 and based on the clusters, a topic arrangement of the event is organized. Thereafter, at block 416, the quantitative tuples and the topic arrangement are stored in a quantitative tuple data store. Thereafter, the routine 400 terminates.

Regarding routines 400, 500, 600 and 700 described above, as well as other processes describe herein, while these routines/processes are expressed in regard to discrete steps, these steps should be viewed as being logical in nature and may or may not correspond to any actual and/or discrete steps of a particular implementation. Also, the order in which these steps are presented in the various routines and processes should not be construed as the only order in which the steps may be carried out. In some instances, some of these steps may be omitted. Moreover, while these routines include various novel features of the disclosed subject matter, other steps (not listed) may also be carried out in the execution of the subject matter set forth in these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard to the quantitative data extraction service 114, as will described below in regard to FIG. 8. As previously mentioned, in various embodiments all or some of the various routines may also be embodied in executable hardware modules including, but not limited to, system on chips, specially designed processors and or logic circuits, and the like on a computer system.

These routines/processes are typically implemented within executable code comprising routines, functions, looping structures, selectors such as if-then and if-then-else statements, assignments, arithmetic computations, and the like. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied in applications (also referred to as computer programs), apps (small, generally single or narrow purposed, applications), and/or methods, these aspects may also be embodied as computer-executable instructions stored by computer-readable media, also referred to as computer-readable storage media. As those skilled in the art will recognize, computer-readable media can host computer-executable instructions for later retrieval and execution. When the computer-executable instructions that are stored on the computer-readable storage devices are executed, the execution thereof causes, configures and/or adapts the computing device to carry out various steps, methods and/or functionality, including those steps, methods, and routines described above in regard to the various illustrated routines. Examples of computer-readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. For purposes of this disclosure, however, computer-readable media expressly excludes carrier waves and propagated signals.

Figure 8:
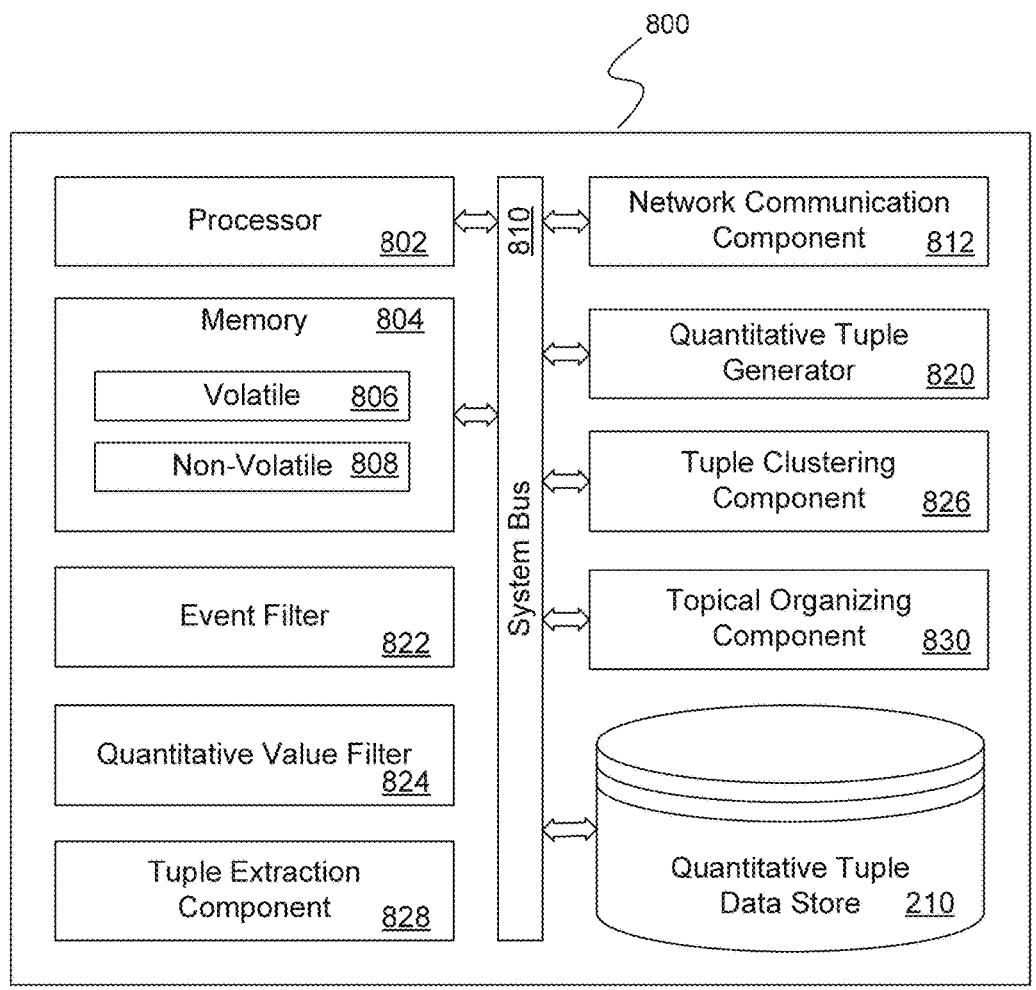
FIG. 8 is a block diagram illustrating exemplary components of a quantitative data extraction service, as implemented on a computing device, suitable for implementing aspects of the disclosed subject matter.

Turning now to FIG. 8, FIG. 8 is a block diagram illustrating exemplary components of a quantitative data extraction service 114, as implemented on a computing device, suitable for implementing aspects of the disclosed subject matter. The exemplary quantitative data extraction service 114 includes one or more processors (or processing units), such as processor 802 and a memory 804, interconnected by way of a system bus 810. The memory 804 typically (but not always) comprises both volatile memory 806 and non-volatile memory 808, as discussed above. Further still, the quantitative data extraction service 114 includes a network communication component 812 for interconnecting the computing device with other devices over a computer network, such as network 108, including social networking services 110 and 112. The network communication component 812, sometimes referred to as a network interface card or NIC, communicates over the network 108 using one or more communication protocols via a wired connection, a wireless connection, or both. As will be readily appreciated by those skilled in the art, a network communication component, such as network communication component 812, is typically comprised of hardware and/or firmware components (and may also include or comprise software components) that transmit and receive digital and/or analog signals over a transmission medium (i.e., the network 108.)

Also included in the exemplary quantitative data extraction service 114 is a quantitative tuple generator 820. The quantitative tuple generator 820 receives one or more directives or instructions to generated quantitative tuples for a particular event and the carries out a process for doing so, as described in regard to routine 400 of FIG. 4. This includes accessing (typically via the network communication component 112) a corpus of user posts from one or more sources over a network 108, executing various filters on the corpus of user posts, these filters including an event filter 822 (as described in regard to routine 500 of FIG. 5) and a quantitative value filter 824 (as described in regard to routine 600 of FIG. 6). After filtering the corpus of user posts, the quantitative tuple generator 820 relies upon the tuple extraction component 828 to extract quantitative tuples 208 from the filtered corpus of user posts (as described in regard to routine 700 of FIG. 7.) The tuple clustering component 826 clusters/aggregates similar tuples into clusters of like tuples after which a topical organizing component 830 organizes or arranges the clusters of quantitative tuples according to topics and, in some instances, subtopics. As indicated above, in various embodiments, the topical organizing component 830 may be configured to generate a topical arrangement of the event according to the topics of the clustered quantitative tuples. As should be appreciated and as indicated above, some of the motivation behind and an advantage realized by organizing, arranging and/or clustering the quantitative tuples into topics and subtopics and/or topical graphs is to create structures and/or taxonomies from the clusters to represent the quantitative information in a manner that can be readily accessed and explored by a person. The topical arrangement of the event, along with the quantitative tuples, are stored in the quantitative tuple data store 210 for future reference and/or access.

Regarding the various components of the exemplary quantitative data extraction service 114, those skilled in the art will appreciate that many of these components may be implemented as executable software modules stored in the memory of the computing device, as hardware modules (including SoCs—system on a chip), or a combination of the two. Moreover, many of the various components may be implemented as an independent, cooperative process or device, operating in conjunction with or on one or more computer systems and or computing devices. It should be further appreciated, of course, that the various components described above in regard to the exemplary quantitative data extraction service 114 should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computer system may be combined together or broke up across multiple actual components and/or implemented as cooperative processes on a computer network.

While the above description is made in specific regard to user posts, it should be appreciated that the disclosed subject matter is not limited to operating solely on user posts. In a suitably configured quantitative data extraction service 114, nearly all content may be accessed and processed for quantitative tuples and a topical arrangement as described above. Indeed, while various novel aspects of the disclosed subject matter have been described, they should be viewed as illustrative embodiments and should not be construed as limiting upon the disclosed subject matter. Variations and alterations to the various aspects may be made without departing from the scope of the disclosed subject matter.

What is claimed:

1. A quantitative data extraction service as implemented on a computing system, the quantitative data extraction service comprising a processor and a memory, wherein the processor executes instructions retrieved from the memory as part of or in conjunction with additional components to generate quantitative tuples from a corpus of user posts, the additional components comprising:
  an executable quantitative tuple generator which, when executing on the processor performs the specialized process of generating quantitative tuples from the corpus of user posts, the quantitative tuple generator coupled to a communications component connected to a network for accessing the corpus of user posts;
  an executable event filter that, in execution, filters the corpus of user posts according to a desired event to create a corpus of filtered user posts consisting of a plurality of users posts from the corpus of user posts that relate to the desired event;
  an executable quantitative value filter that, in execution, filters each of the corpus of filtered user posts according to whether content of the respective each of the corpus of filtered user posts includes a quantitative value, thereby generating a quantitative event content corpus of a plurality of user posts consisting of user posts from the corpus of filtered user posts having a quantitative value in the respective content and relating to the desired event;
  an executable tuple extractor that, in execution, generates from the quantitative event content corpus a body of quantitative tuples corresponding to the desired event, wherein each quantitative tuple of the body of quantitative tuples includes at least a quantitative value extracted from the respective content and a topic, wherein the quantitative value corresponds to the topic; and
  wherein the quantitative tuple generator stores the body of quantitative tuples in a quantitative tuple data store.

2. The quantitative data extraction service of claim 1, wherein the event filter component creates the corpus of filtered user posts by determining, for each user post of the corpus of user posts, whether a user post was generated or distributed at a time that corresponds with the desired event.

3. The quantitative data extraction service of claim 2, wherein the event filter component identifies the corpus of filtered user posts by further determining, for each user post of the corpus of user posts, whether the content of a user post includes subject matter that is related to the desired event.

4. The quantitative data extraction service of claim 1, wherein the quantitative value filter component identifies the quantitative event content by determining, for each user post of the corpus of filtered user posts, whether a user post includes numeric characters in the content of the user post.

5. The quantitative data extraction service of claim 4, wherein the quantitative value filter component identifies the quantitative event content by further determining, for each user post of the corpus of filtered user posts, whether a user post includes numeric text in the content of the user post.

6. The quantitative data extraction service of claim 5, wherein the quantitative value filter component identifies quantitative event content by determining, for each user post of the corpus of filtered user posts, whether a user post includes misspelled numeric text in the content of the user post.

7. The quantitative data extraction service of claim 4, wherein the quantitative value filter component identifies the quantitative event content by determining, for each user post of the second corpus of filtered user posts, whether a user post includes a non-numeric usage of numeric characters in the content of the user post.

8. The quantitative data extraction service of claim 1 further comprising a tuple clustering component aggregating from the body of quantitative tuples similar quantitative tuples into clusters of like quantitative tuples.

9. The quantitative data extraction service of claim 8 further comprising a topical organizing component generating a topical arrangement for the desired event according to the topics of the clustered quantitative tuples in a topical organizing component of the quantitative tuple generator.

10. The quantitative data extraction service of claim 1, wherein the tuple extraction component extracts additional elements from each of the user posts in the quantitative event content corpus related to the quantitative value and corresponding topic, the additional elements comprising at least one of:
  contextual information regarding the quantitative tuple not including the quantitative value or the corresponding topic;
  a confidence value regarding validity of information in the quantitative tuple with regard to the desired event;
  a date of the user post;
  that the user post was generated by an authority of the desired event;
  a location in which the user post was generated; and
  how many user posts are directed to the corresponding topic of the quantitative tuple.

11. A computer implemented method which, when operated on a computer processor, creates a specialized system for generating quantitative tuples, the method comprising:
  accessing, through a network communication component of a computer system having the computer processor, multiple user posts found on the internet by a quantitative tuple generator, the quantitative tuple generator creating a corpus of user posts from the found user posts;
  filtering the corpus of user posts according to a desired event through an event filter component to create a first subset of the corpus of user posts, the first subset comprising a plurality of users posts from the corpus of user posts that have content in the post placed there by the user that relates to the desired event;
  responsive to filtering the corpus of user posts, filtering each post of the first subset through a quantitative value filter component according to whether user placed content of the respective each post of the first subset includes a quantitative value, thereby generating a second subset of user posts comprising user posts from the first subset having a quantitative value in the respective content and relating to the desired event;
  responsive to filtering each post of the first subset, extracting from the second subset a body of quantitative tuples corresponding to the desired event through a tuple extraction component, wherein each of the quantitative tuples of the body of quantitative tuples includes at least a quantitative value extracted from the respective content and a corresponding topic; and
  storing the body of quantitative tuples in a quantitative tuple data store.

12. The method of claim 11, wherein filtering the first corpus of user posts according to the desired event comprises, for each user post of the first corpus of user posts, determining whether a user post was generated or distributed at a time that corresponds with the desired event.

13. The method of claim 12, wherein filtering the corpus of user posts comprises, for each user post of the corpus of user posts, determining whether the content of a user post includes subject matter that is related to the desired event.

14. The method of claim 11, wherein filtering each post of the first subset comprises, for each user post of the first subset, determining any one or more of:
 a user post includes numeric characters in the content of the user post;
 a user post includes numeric text in the content of the user post;
 a user post includes misspelled numeric text in the content of the user post; and
 a user post includes a non-numeric usage of numeric characters in the content of the user post.

15. The method of claim 11 further comprising aggregating similar quantitative tuples from the body of quantitative tuples into clusters of like quantitative tuples.

16. The method of claim 15 further comprising generating a topical arrangement for the desired event according to topics and subtopics of the clustered quantitative tuples.

17. The method of claim 11 further comprising extracting additional elements related to the quantitative value and corresponding topic of at least one quantitative tuple, the additional elements comprising at least one of:
 contextual information regarding the quantitative tuple not including the quantitative value or the corresponding topic;
 a confidence value regarding validity of information in the quantitative tuple with regard to the desired event;
 a date of the user post;
 that the user post was generated by an authority of the desired event;
 a location in which the user post was generated; and
 how many user posts are directed to the corresponding topic of the quantitative tuple.

18. The method of claim 11, wherein the content of the corpus of user posts comprises any one of textual content, audio content, image content, and video content.

19. A computer readable medium bearing computer executable instructions which, when executed on a computing system comprising at least a processor and a memory, carry out a specialized method for generating quantitative tuples, the method comprising:
 accessing, through a network communication component of the computer system and executed on the processor of the computer system, a plurality of user posts retrieved from the internet by a quantitative tuple generator, the quantitative tuple generator creating a corpus of user posts from a subset of the retrieved user posts;
 filtering the corpus of user posts through an event filter component to create a first subset of user posts that were generated in response to occurrence of an event, the first subset comprising a plurality of users posts from the corpus of user posts each having content placed in the post by a user that relates to the event;
 filtering each post in the first subset through a quantitative value filter component to create a second subset of user posts, each of which includes a quantitative value in the respective user content relating to the event;
 extracting from content of the posts in the second subset a body of quantitative tuples corresponding to the event through a tuple extraction component, wherein each quantitative tuple of the body of quantitative tuples of the body of quantitative tuples includes at least a quantitative value and a corresponding topic; and
 storing the body of quantitative tuples in a quantitative tuple data store.

20. The computer readable medium of claim 19, wherein the method further comprises:
 aggregating similar quantitative tuples from the body of quantitative tuples into clusters of like quantitative tuples; and
 generating a topical arrangement for the desired event according to the topics of the clustered quantitative tuples.

* * * * *